(12) United States Patent
Yamada et al.

(10) Patent No.: US 11,192,406 B2
(45) Date of Patent: Dec. 7, 2021

(54) NEUTRALIZATION DEVICE FOR VEHICLES

(71) Applicant: TOYOTA JIDOSHA KABUSHIKI KAISHA, Toyota (JP)

(72) Inventors: Koshi Yamada, Odawara (JP); Yoji Kanehara, Nagoya (JP); Toshio Tanahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 911 days.

(21) Appl. No.: 15/951,111

(22) Filed: Apr. 11, 2018

(65) Prior Publication Data

US 2018/0297420 A1    Oct. 18, 2018

(30) Foreign Application Priority Data

Apr. 13, 2017   (JP) .............................. JP2017-079480

(51) Int. Cl.
| | | |
|---|---|---|
| *B60C 19/08* | (2006.01) | |
| *B60R 16/06* | (2006.01) | |
| *F15D 1/00* | (2006.01) | |
| *B60B 5/00* | (2006.01) | |
| *B62D 37/02* | (2006.01) | |

(52) U.S. Cl.
CPC ............ *B60C 19/086* (2013.01); *B60R 16/06* (2013.01); *F15D 1/0075* (2013.01); *B60B 5/00* (2013.01); *B60B 2900/921* (2013.01); *B62D 37/02* (2013.01)

(58) Field of Classification Search
CPC ..... B60C 19/086; B60R 16/06; F15D 1/0075; B60B 5/00; B60B 2900/921; B62D 37/02

USPC ....................................................... 152/152.1
See application file for complete search history.

(56) References Cited

U.S. PATENT DOCUMENTS

| | | | |
|---|---|---|---|
| 6,653,646 B1 | 11/2003 | Shibata | |
| D604,685 S * | 11/2009 | Zhou ........................... D12/211 |
| 2003/0015910 A1* | 1/2003 | Ichikawa .................. B60B 7/04 |
| | | | 301/37.28 |
| 2008/0308203 A1* | 12/2008 | Kunisawa ............... B60C 19/08 |
| | | | 152/152.1 |
| 2010/0243115 A1 | 9/2010 | Wada | |
| 2016/0185310 A1* | 6/2016 | Tanahashi ............. B62D 35/00 |
| | | | 361/217 |
| 2016/0230824 A1* | 8/2016 | Tanahashi ........... F16D 65/0068 |
| 2016/0280162 A1* | 9/2016 | Yamada ................ B62D 35/00 |

FOREIGN PATENT DOCUMENTS

| | | |
|---|---|---|
| JP | H09267603 A | 10/1997 |
| JP | 2000-019296 A | 1/2000 |
| JP | 2009-113597 A | 5/2009 |
| KR | 20160067906 A | 6/2016 |
| WO | 2015-064195 A1 | 5/2015 |

* cited by examiner

*Primary Examiner* — Thienvu V Tran
*Assistant Examiner* — Sreeya Sreevatsa
(74) *Attorney, Agent, or Firm* — Hunton Andrews Kurth LLP

(57) ABSTRACT

A neutralization device that neutralizes static electricity on a portion of a vehicle exposed to outside. The neutralization device causes corona discharge according to a positive potential thereof. The neutralization device is attached to a surface exposed outwardly widthwise of the vehicle in at least one of an inner circumferential portion of a tire and a predetermined point of an outer surface of tire wheel.

11 Claims, 9 Drawing Sheets

NEUTRALIZATION DEVICE FOR VEHICLES

The present invention claims the benefit of Japanese Patent Application No. 2017-079480 filed on Apr. 13, 2017 with the Japanese Patent Office, the disclosure of which are incorporated herein by reference in its entirety.

BACKGROUND

Field of the Invention

Embodiments of the present invention relates to the art of a neutralization device for neutralizing static charges accumulating on vehicles.

Discussion of the Related Art

PCT international publication WO2015/064195 describes a vehicle in which a running stability is improved by neutralizing static electricity accumulated on a vehicle body. According to the teachings of WO2015/064195, a self-discharge device that neutralizes static electricity is attached to a point at which positively charged airflow flowing along the vehicle body deviates therefrom. In the vehicle taught by WO2015/064195, for example, the self-discharge device is attached to a rotational center of a wheel.

A vehicle body may be insulated from a road surface by rubber tires made of insulating material containing silica. However, the vehicle body may be charged with static electricity. JP-A-2009-113597 describes a pneumatic tire comprising an electrically conductive path made of electrically conductive rubber material that extends from a rim to a tread ground contact surface. According to the teachings of JP-A-2009-113597, therefore, static electricity in the vehicle may be discharged to a road surface through the conductive path.

JP-A-2000-19296 describes a device for activating substance. The device taught by JP-A-2000-19296 activated air in a tire to prevent flattening of the tire resulting from pressure difference. To this end, according to the teachings of JP-A-2000-19296, a radiation emitting means emits radiation to air in the tire, and a wheel to which the tire is applied is made of conductive metal.

A running stability of vehicles may be improved by attaching the self-discharge device taught by WO2015/064195 to the rotational center of the wheel. However, it is further preferable to neutralize the static electricity other than in the vicinity of a hub of the wheel.

The static electricity accumulating on the vehicle body may be discharged to the road surface. However, the vehicle body may not be charged with the static electricity homogeneously. For example, the static electricity may concentrate on a portion at which electric conductivity of a coating is low and a portion formed of resin material. If such portion on which the static electricity concentrate is exposed to air, the air flowing along a vehicle surface may be separated from the vehicle surface by repulsive force acting between the airflow and the static electricity. Consequently, a running stability of the vehicle may be decreased.

SUMMARY

Aspects of embodiments of the present invention have been conceived noting the foregoing technical problems, and it is therefore an object of embodiments of the present invention to provide a neutralization device that neutralizes static electricity on a portion of a vehicle exposed to outside.

The neutralization device according to the embodiment of the present disclosure is used in a vehicle having a pair of front wheels and a pair of rear wheels. Each of the wheels includes a tire wheel attached to a vehicle body and a tire made of non-conductive material that is mounted on the tire wheel. According to the embodiment, the tire wheel comprises a non-conductive predetermined member. The predetermined member further includes a predetermined point that is situated predetermined distance away from a rotational center of the tire wheel and that is exposed to outside the vehicle. The tire includes an inner circumferential portion fitted onto the tire wheel. The neutralization device is adapted to cause corona discharge when a positive potential of the point to which the neutralization device is attached exceeds a predetermined value. In the vehicle, the neutralizing device is attached to a surface exposed outwardly widthwise of the vehicle in at least one of the inner circumferential portion of the tire and a predetermined portion of the predetermined member.

In a non-limiting embodiment, the neutralization device may include a conductive tape having an edge at which the corona discharge is caused.

In a non-limiting embodiment, a total perimeter of the neutralization device per wheel may be set within a range from 170 mm to 185 mm.

In a non-limiting embodiment, the neutralization device may include a coating containing conductive material on which projections are formed to cause the corona discharge.

In a non-limiting embodiment, a total area of the coating per wheel may be set within a range from 39.0 $mm^2$ to 42.5 $mm^2$.

In a non-limiting embodiment, the neutralization device may contain conductive metal.

In a non-limiting embodiment, the neutralization device may contain conductive polymer molecule.

In a non-limiting embodiment, the predetermined member may further include a non-conductive coating material.

In a non-limiting embodiment, the tire wheel may further comprise a center portion attached to the vehicle body, a rim portion on which the tire is mounted, and a plurality of spoke portions extending radially between the center portion and the rim portion. In addition, the predetermined member may be applied to at least one of the spoke portion and the rim portion.

In a non-limiting embodiment, the predetermined member may include a wheel cap made of non-conductive resin material that is attached to the tire wheel.

In a non-limiting embodiment, the neutralization device may be attached to at least one of the pair of front wheels and the pair of rear wheels.

Thus, according to the embodiment of the present disclosure, the neutralization device causes corona discharge when the positive potential of the point to which the neutralization device is attached exceeds the predetermined value, and the neutralization device is attached to at least one of the exposed surface of the inner circumferential portion of the tire and the predetermined point of the predetermined member. According to the embodiment, therefore, negative ions are attracted to the neutralization device so that static electricity accumulating around the neutralization device is neutralized. Specifically, the neutralization device is attached to the predetermined point situated radially away from the rotational center of the tire wheel. According to the embodiment, therefore, orbit area of the neutralization device where the negative ions are produced can be enlarged. For this reason, the static electricity accumulating on the outer surface of the tire and the tire wheel may be neutralized entirely and homogeneously in a large area. In addition, the static electricity is also neutralized by the corona discharge of the neutralization device 12. Consequently, repulsive force acting between an airflow and the point to which the neutralization device is attached is damped to prevent separation of the airflow from the outer surface of the wheel. For these reasons, desired aerodynamic characteristics of the vehicle can be ensured to improve a driving stability of the vehicle, especially in the rolling direction and the yawing direction.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENTS

Figure 1:
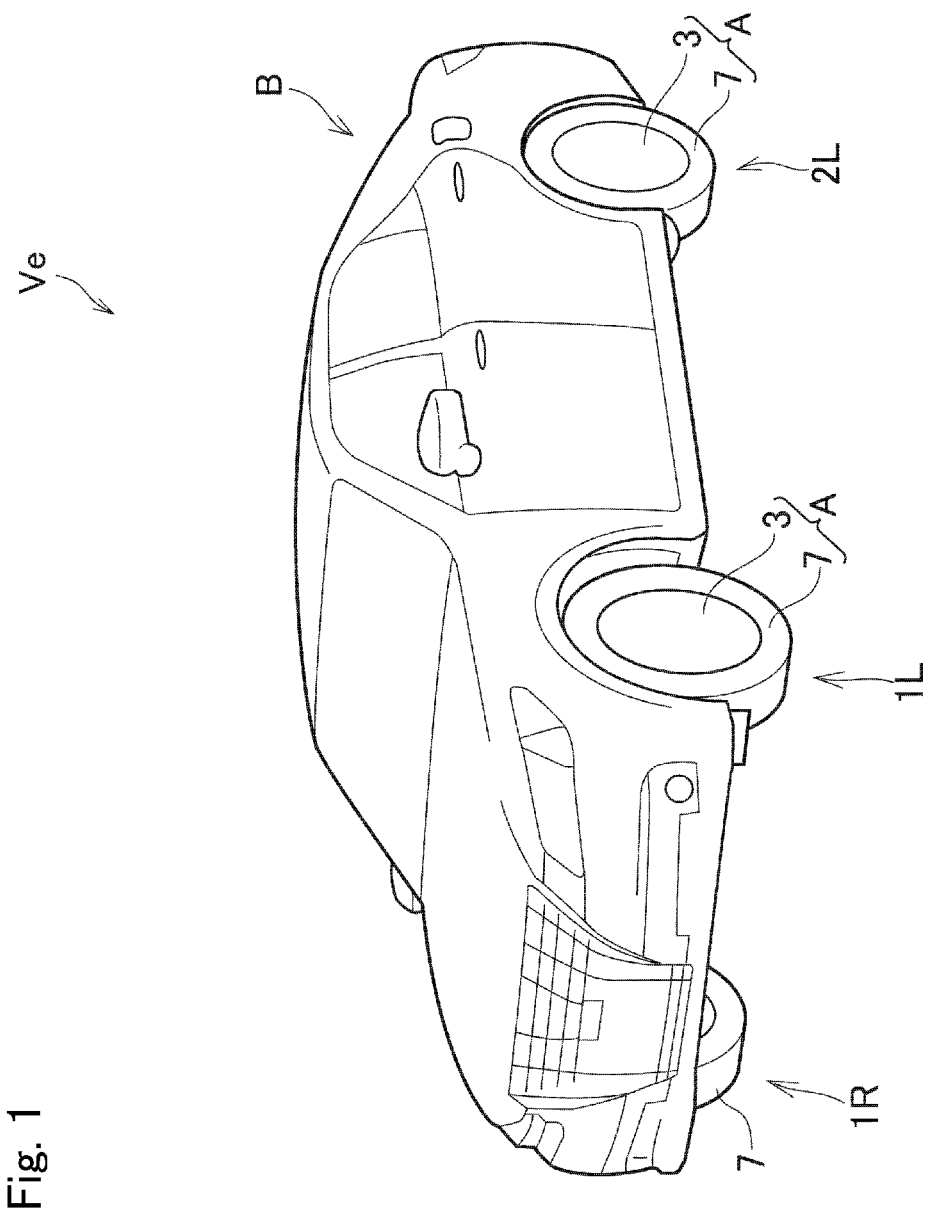
FIG. 1 is a perspective view showing one example of a vehicle to which the neutralization device according to the embodiment of the present disclosure is applied.

Referring now to FIG. 1, there is shown one example of a vehicle to which the self-discharge neutralization device according to the embodiment is applied. The vehicle Ve shown in FIG. 1 is a sedan-type vehicle comprising a pair of front wheels 1R and 1L, and a pair of rear wheel 2R and 2L. In each wheel 1R, 1L, 2R, and 2L, a tire assembly A is attached to a wheel hub (not shown) connected to a vehicle body B. The tire assembly A comprises a tire wheel 3 and a rubber tire 7 mounted on the tire wheel 3.

Figure 2:
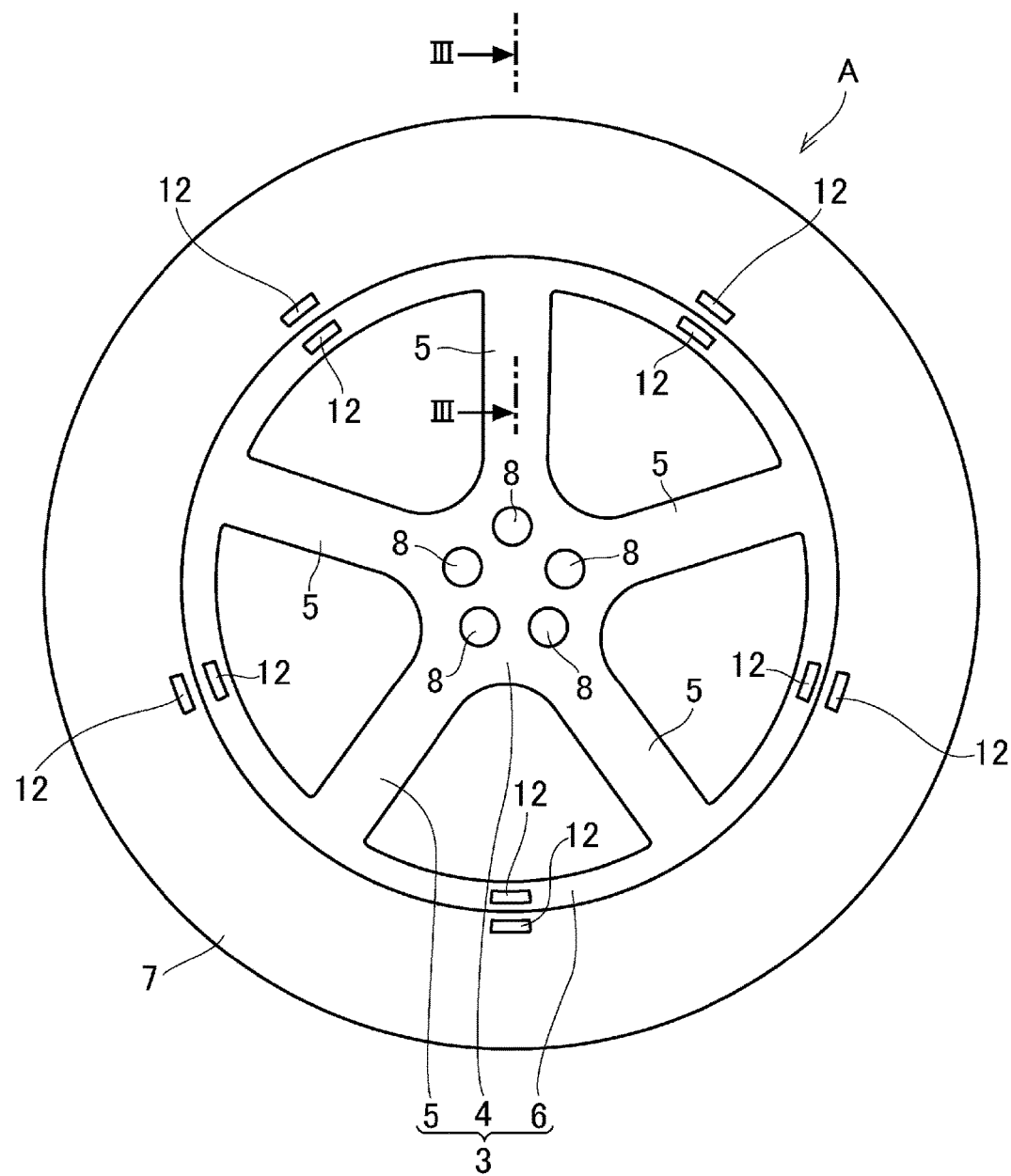
FIG. 2 is a schematic illustration showing one example of a tire assembly.

An example of the tire assembly A is shown in FIG. 2. The tire wheel 3 comprises a center portion 4 attached to the wheel hub, a cylindrical rim portion 6, and a plurality of spoke portions 5 extending radially between the center portion 4 and the rim portion 6. The tire 7 is applied to the rim portion 6 of the tire wheel 3. A plurality of bolt holes 8 are circumferentially formed on the center portion 4 to receive bolts therethrough to connect the tire wheel 3 to the wheel hub, and nuts are screwed on the bolts.

Figure 3:
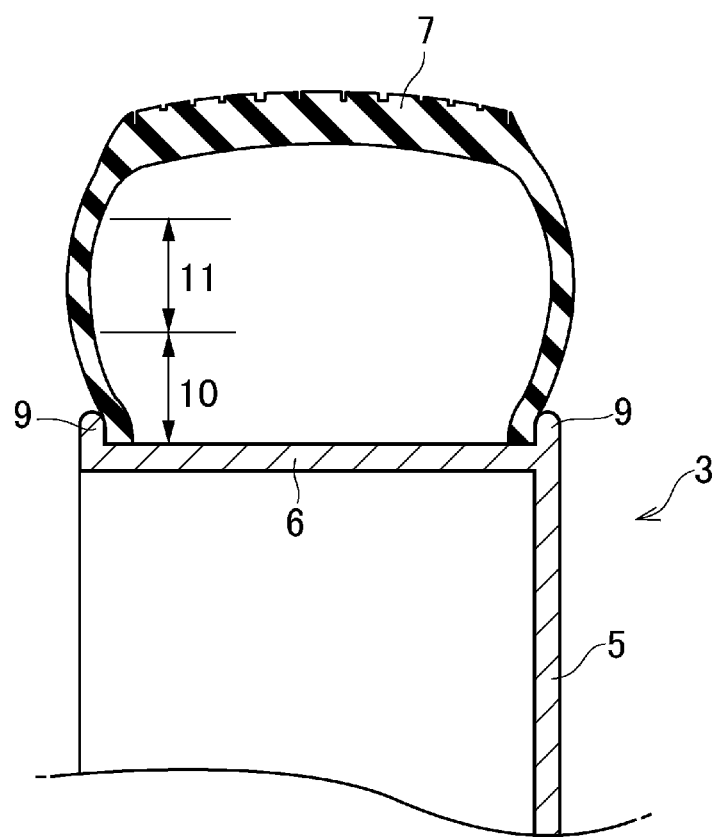
FIG. 3 is a cross-sectional view showing a cross-section along III-III line in FIG. 2.

FIG. 3 shows a cross-section of the tire assembly A along III-III line in FIG. 2. As shown in FIG. 3, a flange portion 9 is formed on each axial end of the rim portion 6. In the tire 7, a width between bead portions 10 as inner circumferential portions is narrower than a width between side wall portions 11, and inner circumferences of the bead portions 10 are fitted into a clearance between the flange portions 9.

In order to prevent rust formation or to improve design, a surface of the tire wheel 3 is coated with a non-conductive coating material such as a resin coating whose electrical resistance is greater but electrical conductivity is lower than those of metal material. Accordingly, the coating material serves as a "predetermined member" of the embodiment.

During propulsion of the vehicle Ve, static charges may accumulate on the wheels 1R, 1L, 2R, and 2L due to friction between the tire 7 and the road surface, and an electrical spark resulting from detachment of the tire 7 from the road surface. The positive static charges may also accumulate on the wheels 1R, 1L, 2R, and 2L due to friction at a joint portion between the tire 7 and the rim portion 6. Such static charges accumulate especially on the coated surface of the spoke portions 5 and the rim portion 6 where the electrical conductivity is low.

As described, the tire 7 bulges at the side wall portion 11 outwardly from the bead portion 10 (i.e., outwardly widthwise of the vehicle Ve). For this reason, during propulsion of the vehicle Ve, air flowing along the side of the vehicle Ve deviates outwardly from an outer surface of the side wall portion 11 at the boundary between the side wall portion 11 and the bead portion 10. In addition, positive static charges accumulate on the coated surface of the spoke portions 5 and the rim portion 6, and the air is also charged positively. For this reason, repulsive force acts between the air flowing along the outer surface of the tire assembly A and the outer surface of the tire assembly A, at the spoke portions 5, the rim portion 6, and the joint portion between the tire 7 and the rim portion 6.

Figure 4:
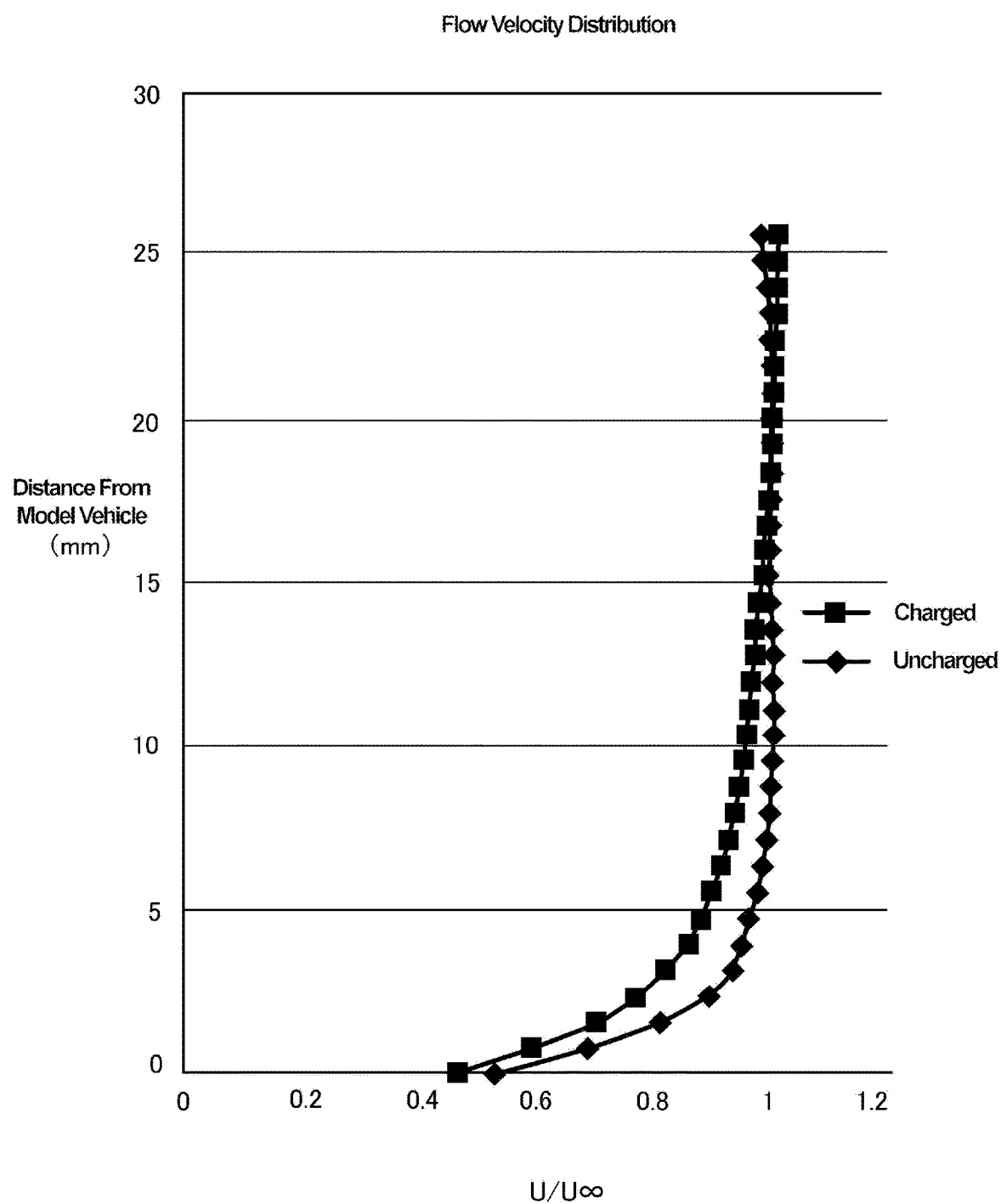
FIG. 4 is a graph indicating measurement results of flow velocity distributions in a direction perpendicular to a surface of a model vehicle.

Turning to FIG. 4, there are shown measurement results of flow velocity distribution of the airflow flowing on a positively charged surface of a model vehicle, and flow velocity distribution of the airflow flowing on an uncharged surface of a model vehicle. In FIG. 4, the vertical axis represents a distance from the surface of the model vehicle, and the horizontal axis represents a ratio of a flow velocity U of the air flowing on the surface of the model vehicle to a flow velocity U∞ measured from a predetermined distance (U/U∞). Square dots represent measured values of flow velocity of the air flowing on the positively charged surface of the model vehicle, and rhombus dots represent measured values of flow velocity of the air flowing on the uncharged surface of the model vehicle.

As can be seen from FIG. 4, a thickness of a boundary layer (i.e., a distance from the vehicle surface at which the ratio U/U∞ is substantially "1") of the case in which the surface of the model vehicle is positively charged is thicker than that of the case in which the surface of the model vehicle is not charged. This means that the airflow is isolated further away from the positively charged surface of the model vehicle in comparison with the case in which the surface is not charged. This is because the airflow is charged positively and hence the positively charged airflow and the positively charged surface of the vehicle repel each other. By neutralizing the static electricity on the surface of the vehicle body B to decrease positive potential, direction of the airflow may be changed from that of the case in which the vehicle body B is charged positively (i.e., the direction deviating from the vehicle body B) to that of the case in which the vehicle body is not charged positively (i.e., the direction along the vehicle body B). That is, separation of the airflow from the outer surface of the vehicle body can be prevented.

A point at which the positively charged airflow is separated from the surface of the model vehicle, and a degree of such separation of the airflow are changed depending on positive potential of the model vehicle. Specifically, if the spoke portions 5 and the rim portion 6 are charged positively, the airflow deviates from the spoke portions 5 and the rim portion 6, and the airflow is separated further away from the spoke portions 5 and the rim portion 6 with an increase in the positive potential of the spoke portions 5 and the rim portion 6. As a result, stability of the vehicle Ve may be reduced in the rolling direction and the yawing direction. In order to prevent such separation of the airflow from the wheels 1R, 1L, 2R, 2L, according to the embodiment, a self-discharge neutralization device (as will be simply called the "neutralization device" hereinafter) 12 is attached to the coated surface of the tire assembly A.

The neutralization device 12 is adapted to cause corona discharge when the positive potential of the point to which the neutralization device 12 is attached exceeds a predetermined value. In the example shown in FIG. 2, a plurality of the neutralization device 12 are attached to the surface exposed outwardly widthwise of the vehicle Ve in the bead portion 10 of the tire 7 and the rim portion 6 of the tire wheel 3. A plurality of the neutralization device 12 may also be attached to the surface of the spoke portions 5 of the tire wheel 3 exposed to the outside in the vehicle width direction.

For example, the neutralization device 12 may be made of gold, silver, copper, aluminum etc. (i.e., conductive metal material). Given that aluminum is used as the material of the neutralization device 12, it is preferable to apply an anti-oxidizing processing to the neutralization device 12 to prevent deterioration in electric conductivity resulting from oxidation. Specifically, the neutralization device 12 is an adhesion tape comprising a conductive metal film and a conductive adhesive layer, and for example, the neutralization device 12 may be cut out of a conductive aluminum reel tape in such a manner as to form an edge at which the corona charge is expedited.

A potential of the neutralization device 12 is increased with an increase in a potential of static electricity accumulating on a portion to which the neutralization device 12 is attached. During propulsion of the vehicle Ve, the tire 7 and the coated surface of the spoke portions 5 and the rim portions 6 are charged positively, and hence the neutralization device 12 attached thereto are charged positively. Consequently, negative ions (or minus ions) are attracted to the neutralization device 12 and corona discharge is caused eventually by the neutralization device 12. That is, the neutralization device 12 discharges positive static electricity without being charged by an electrical equipment such as a battery. At the same time, accumulation of static electricity on the point to which the neutralization device 12 attached is neutralized to decrease positive potential so that repulsive force acting between the airflow and the point to which the neutralization device 12 is attached is damped. As a result of such attraction of the negative ions and reduction in the repulsive force resulting from corona discharge, separation of the airflow flowing along the side faces of the wheels 1R, 1L, 2R, and 2L can be prevented. In addition, change in an air pressure around the wheels 1R, 1L, 2R, and 2L can be suppressed. For these reasons, desired aerodynamic characteristics can be ensured to improve a driving stability especially in the rolling direction and the yawing direction from an extremely low sped range to a high speed range.

Instead, the neutralization device 12 may also be formed of conductive polymer molecule such as polyaniline, polypyrrole and polythiophene, conductive plastic, metal plating, conductive coating material containing metal powder and so on.

Figure 5:
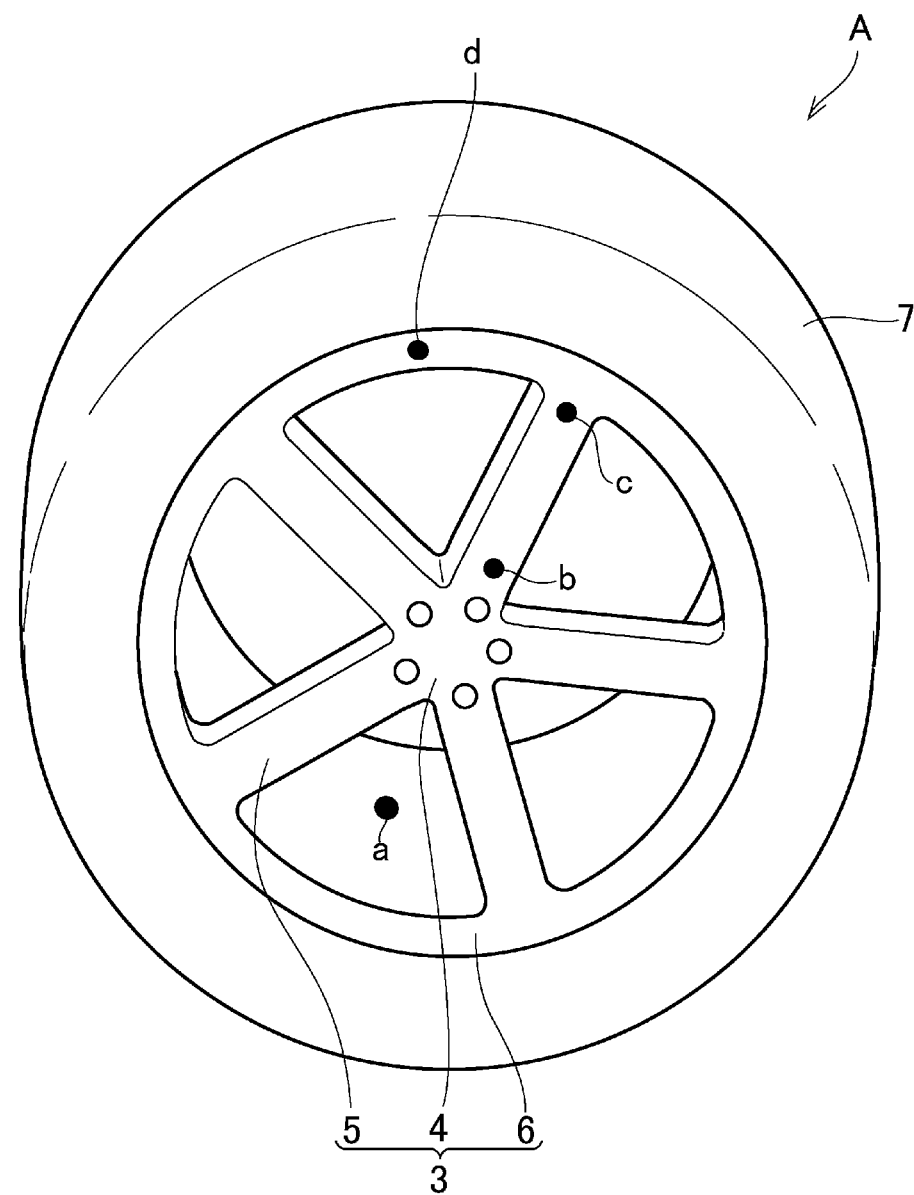
FIG. 5 is a perspective view showing points to which the neutralization devices are attached in the tire assembly.

The applicant of the present disclosure has conducted a driving test to find out effective points in the tire wheel 3 to improve the running stability by attaching the neutralization device 12. In FIG. 5, there are shown the points in the tire wheel 3 to which the neutralization devices 12 are attached in the driving test. Specifically, in a first test, the neutralization device 12 was attached only to a point "a" in an inner circumferential face of the rim portion 6 of the tire wheel 3. In a second test, the neutralization device 12 was attached only to a point "b" in the spoke portion 5 near the center portion 4. In a third test, the neutralization device 12 was attached only to a point "c" in the spoke portion 5 near the rim portion 6. In a fourth test, the neutralization device 12 was attached only to a point "d" in the rim portion 6. It is to be noted that same neutralization device 12 was used in all of those tests.

Figure 6:
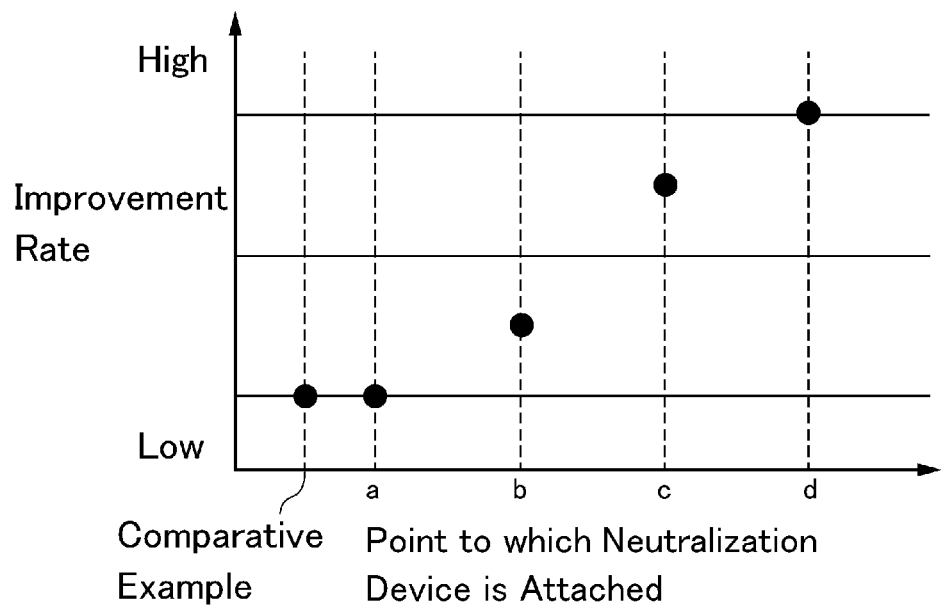
FIG. 6 is a graph indicating a result of a driving test to evaluate reduction in static electricity depending on the point to attach the neutralization device.

Results of the driving tests are shown in FIG. 6. In FIG. 6, the vertical axis represents an improvement rate of the running stability, and the horizontal axis represents the points to which the neutralization device 12 was attached. In addition, a result of a comparative example in which the vehicle Ve was propelled without attaching the neutralization device 12 is also indicated in FIG. 6.

As can be seen from FIG. 6, no improvement in the running stability could be achieved by attaching the neutralization device 12 only to the point "a" in comparison with the comparative example. This means that the separation of the airflow may be prevented inside of the tire wheel 3, but the separation of the airflow from the outer surface of the tire assembly A could not be prevented by attaching the neutralization device 12 only to the point "a".

As also can be seen from FIG. 6, the running stability of the vehicle Ve was improved from the second test in which the neutralization device 12 was attached to the point "b", and the running stability of the vehicle Ve was improved most effectively in the fourth test in which the neutralization device 12 was attached to the point "d". That is, the running stability of the vehicle Ve was improved with an increase in a distance from a rotational center of the tire wheel 3 to the point to which the neutralization device 12 was attached. As described, the neutralization device 12 is adapted to neutralize the static electricity accumulating on the point to which the neutralization device 12 is attached by producing negative ions in the air around the point to which the neutralization device 12 is attached. Therefore, it may be possible to widen an area to produce the negative ions by attaching the neutralization device 12 to a point possible to create a large orbit area by a rotation of the tire assembly A. In addition, the air flowing along the outer surface of the tire wheel 3 may be agitated by the rotation of the tire assembly A. For these reasons, the static electricity accumulating on the outer surface of the side wall portion 11 and the bead portion 10, and the outer surface of the tire wheel 3 may be neutralized entirely and homogeneously by attaching the neutralization device 12 to a radially outer point in the tire wheel 3. Likewise, the running stability of the vehicle Ve was also improved as effective as the case of the fourth test by attaching the neutralization device 12 to the outer surface of the bead portion 10 of the tire 7.

Thus, according to the embodiment, the point to which the neutralization device 12 is attached is determined based on the result of the experiment in such a manner as to achieve a desired running stability. Specifically, the point to which the neutralization device 12 is attached in the rim portion 6 is situated predetermined distance away from the rotational center axis of the tire wheel 3, and the distance between the rotational center of the tire wheel 3 and the point to which the neutralization device 12 is attached is determined based on the result of the experiment, depending on the types of vehicle.

Figure 7:
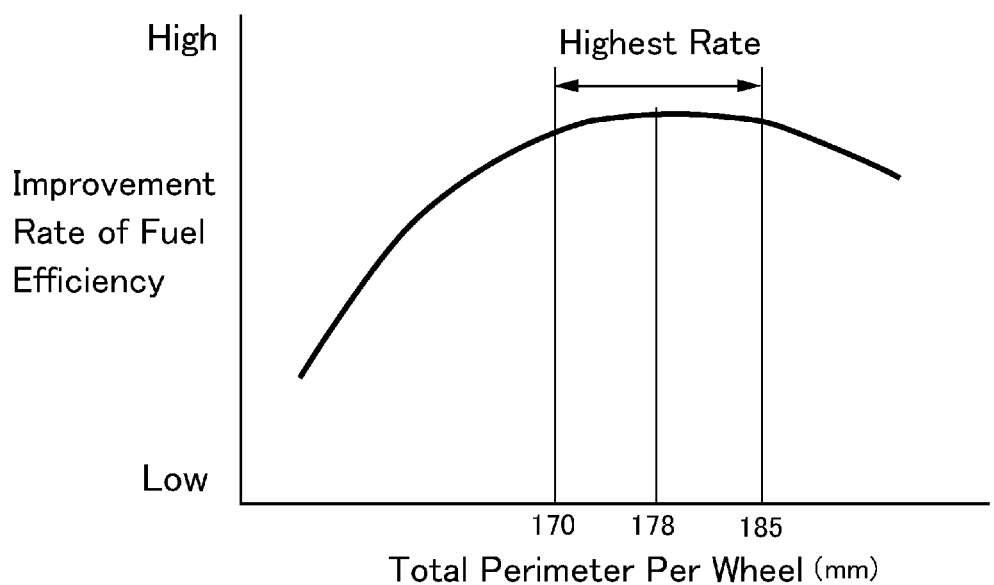
FIG. 7 is a graph indicating a relation between a total length of a tape applied as the neutralization device to the wheel and an improvement rate of fuel consumption.

The applicant of the present disclosure has also conducted another driving test to find out whether the improvement rate of running stability differs depending on a size of the neutralization device 12. In another driving test, specifically, at least one conductive film such as an aluminum film (i.e., tape) was/were attached as the neutralization device 12 to the coated outer surface of the rim portion 6, and another driving test was conducted plurality of times while changing the size and number of the neutralization device 12. Result of another driving test is shown in FIG. 7. In FIG. 7, the vertical axis represents an improvement rate of fuel efficiency in comparison with the fuel efficiency of the vehicle Ve propelled without attaching the neutralization device 12 to the rim portion 6, and the horizontal axis represents a total perimeter of the neutralization device(s) 12 per wheel. Another driving test was conducted on a same course while controlling a driving force and a braking force in such a manner as to propel the vehicle Ve at a constant speed, that is, to stabilize vehicle behavior. Accordingly, the fuel efficiency of the vehicle Ve is improved with an improvement of the vehicle behavior. The applicant of the present disclosure has also found out that the improvement rate of fuel efficiency is correlated to the running stability of the vehicle based on an experimental result. In another driving test, therefore, the improvement rate of running stability was obtained based on the improvement rate of fuel efficiency. As described, the corona charge is expedited at the edge of the neutralization device 12. That is, given that a total area of the neutralization device 12 is same, a total length of the edge may be increased by dividing the neutralization device 12 into a plurality of sheets to enhance neutralization effect of the neutralization device 12.

As can be seen from FIG. 7, the fuel efficiency is improved with an increase in the perimeter of the neutralization device 12 to a predetermined value (i.e., to 178 mm). However, the fuel efficiency starts dropping upon exceedance of another predetermine value of the perimeter of the neutralization device 12. This means that the separation of the airflow flowing along the outer surface of the tire assembly A may be prevented by increasing the total perimeter of the neutralization device(s) 12. However, if the attraction of the neutralization device(s) 12 is too strong, the airflow may be aspirated into a wheel house to reduce the fuel efficiency. For these reasons, as can be seen from FIG. 7, the improvement rate of fuel efficiency was highest within a range of the total perimeter of the neutralization device(s) 12 from 170 mm to 185 mm. Accordingly, it is preferable to set the total perimeter of the neutralization device(s) 12 attached to each tire assembly A within the range from 170 mm to 185 mm. Here, given that the total perimeter of the neutralization device(s) 12 is same, same improvement in fuel efficiency can be achieved irrespective of whether the neutralization device 12 is divided into a plurality of sheets.

As described, the neutralization device 12 may also be formed of conductive coating material containing metal powder instead of the metal sheet. As well known in the art, corona discharge is caused at a sharp point of a charged object. In a case of using the conductive coating material to form the neutralization device 12, therefore, conductive powder material is mixed with the coating material to form projections on a surface of the neutralization device 12.

Figure 8:
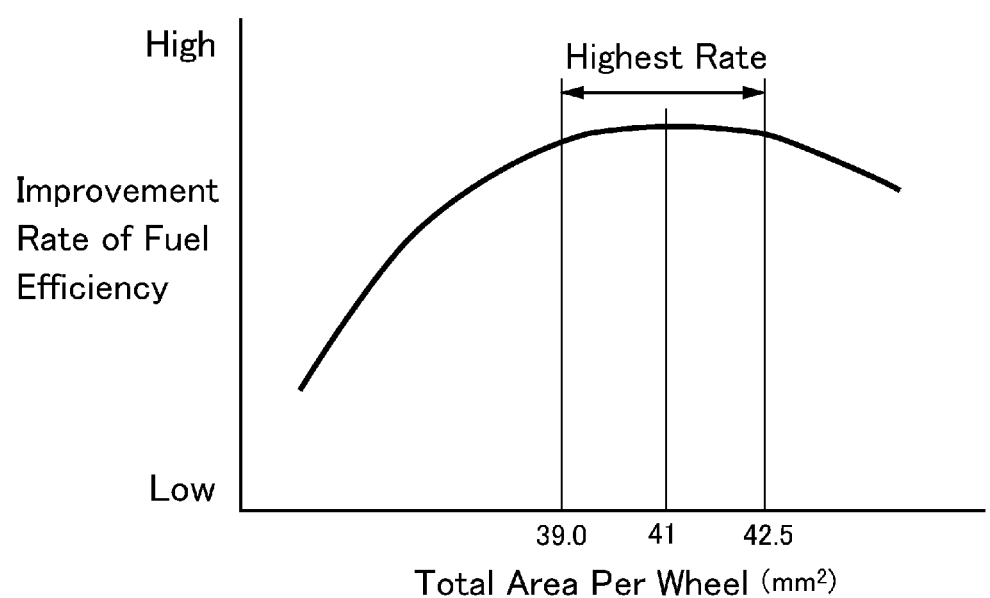
FIG. 8 is a graph indicating a relation between a total area of a coating applied as the neutralization device to the wheel and an improvement rate of fuel consumption.

The applicant of the present disclosure has also conducted still another driving test to find out an optimum area of the neutralization device 12 formed of conductive coating material applied to the rim portion 6. Result of still another driving test is shown in FIG. 8. In FIG. 8, the vertical axis represents an improvement rate of fuel efficiency, and the horizontal axis represents a total area of the neutralization device(s) 12 applied to the rim portion 6 of each tire wheel 3.

As can be seen from FIG. 8, the fuel efficiency is improved with an increase in the total area of the neutralization device(s) 12 to a predetermined value (i.e., to 41 mm$^2$). However, the fuel efficiency starts dropping upon exceedance of another predetermine value of the total area of the neutralization device 12. That is, as the case of another driving test, if the attraction of the neutralization device(s) 12 is too strong, the airflow flowing along the outer surface of the tire assembly A may be aspirated into the wheel house to reduce the fuel efficiency. For this reason, as can be seen from FIG. 8, the improvement rate of fuel efficiency was highest within a range of the total area of the neutralization device(s) 12 from 39.0 mm$^2$ to 42.5 mm$^2$. Accordingly, it is preferable to set the total area of the neutralization device(s) 12 applied to each tire assembly A within the range from 39.0 mm$^2$ to 42.5 mm$^2$. Here, given that the total area of the neutralization device(s) 12 is same, same improvement in fuel efficiency can be achieved irrespective of whether the neutralization device 12 is applied to a plurality of points in the rim portion 6.

Figure 9:
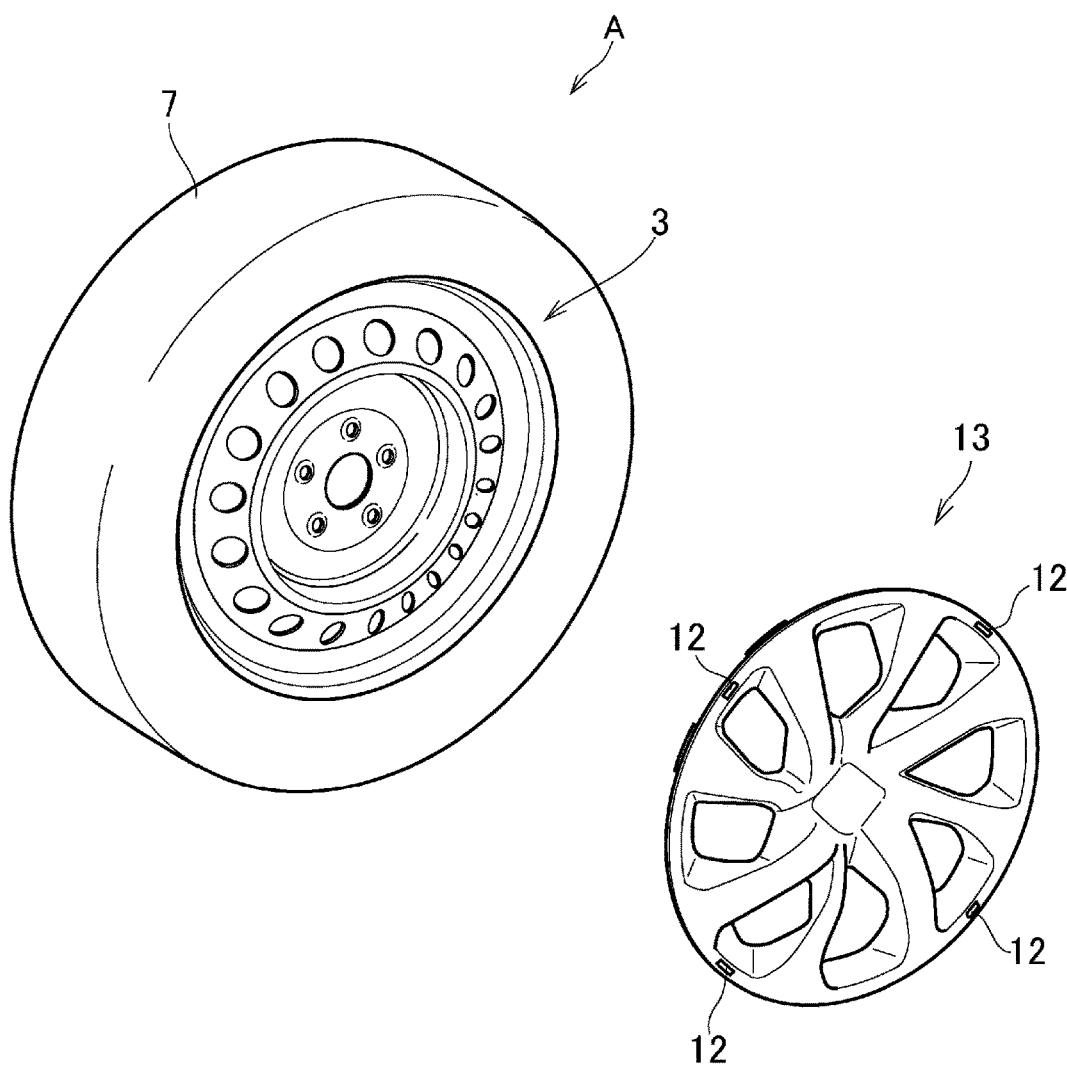
FIG. 9 is a perspective view showing an example in which the neutralization device is attached to a wheel cap.

The neutralization device 12 may also be attached to a wheel cap attached to the tire wheel 3, instead of attaching the neutralization device 12 directly to the tire wheel 3. One example of the wheel cap as a predetermined member of the embodiment is shown in FIG. 9. The wheel cap 13 shown in FIG. 9 is made of non-conductive resin material, and attached to the tire wheel 3 from outer side so as to cover the outer surface of the tire wheel 3 entirely. In the outer surface of the wheel cap 13, for example, the neutralization device 12 may be attached to portions corresponding to the spoke portions 5 and the rim portion 6 at the above-explained points.

Figure 10:
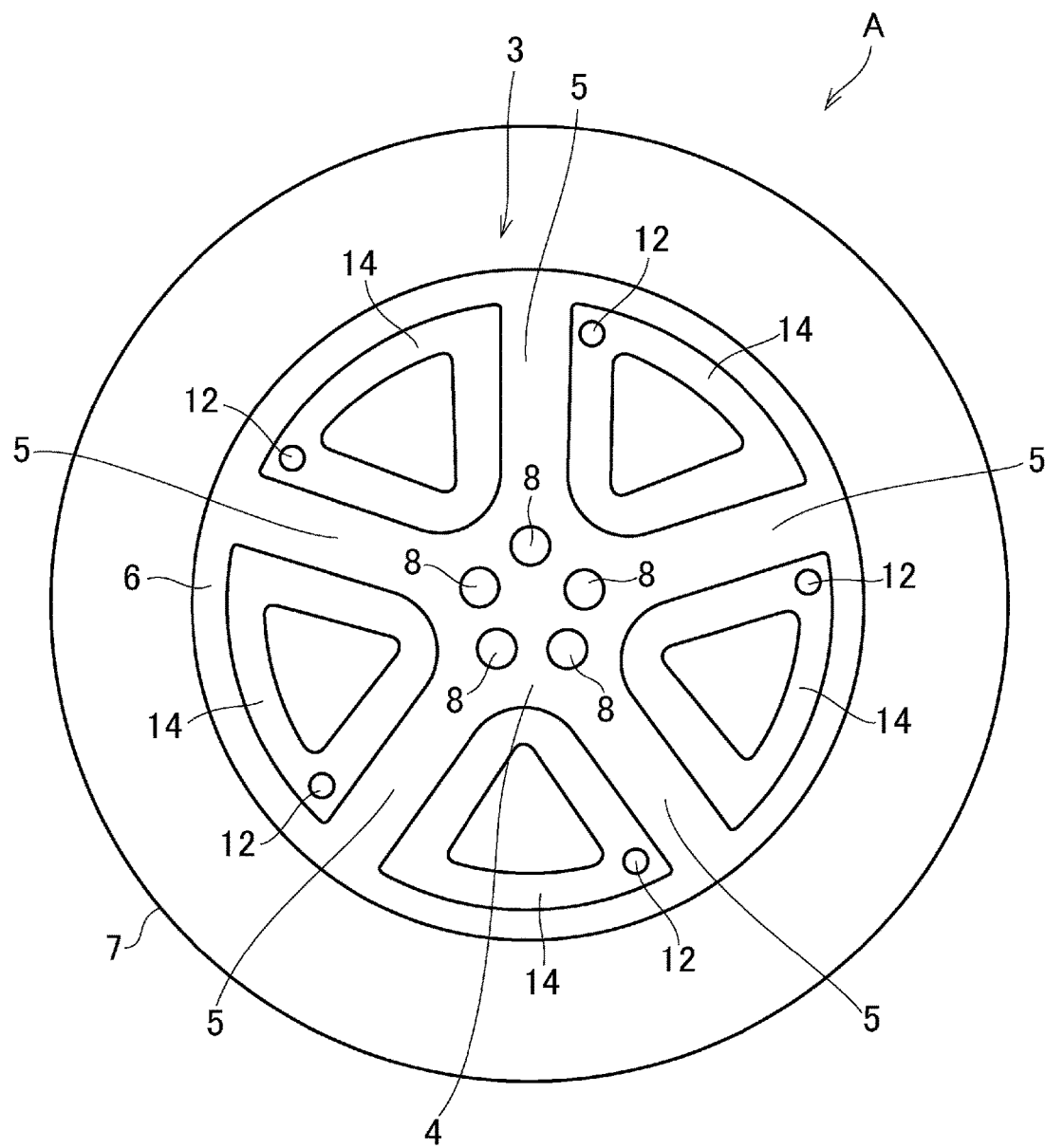
FIG. 10 is a schematic illustration showing an example in which the neutralization device is attached to a cap fitted into a clearance between spokes.

FIG. 10 shows another example of the wheel cap. According to another example shown in FIG. 10, the cap 14 is also made of non-conductive resin material, and fitted into a clearance between spoke portions 5. In this case, the neutralization device 12 may be attached to a radially outer portion of the cap 14. Since the cap 14 is also made of non-conductive resin material, potential of the static electricity accumulating thereon is high. That is, the static electricity may be neutralized effectively. According to another example, therefore, it may be sufficient to attach the neutralization device 12 to only one of the caps 14.

The neutralization device 12 may be attached not only to all of the wheels 1R, 1L, 2R, and 2L, but also to only one of the pairs of the front wheels 1R and 1L and the rear wheels 2R and 2L. However, if the neutralization device 12 is attached to only one of the right wheel 1R or 1L and the left wheel 1L or 2L, the vehicle behavior may be changed depending on a turning direction. Therefore, it is preferable to attach the neutralization device 12 to both of the right wheel and the left wheel.

Although the above exemplary embodiments of the present application have been described, it will be understood by those skilled in the art that the present application should not be limited to the described exemplary embodiments, and various changes and modifications can be made within the scope of the present disclosure.

What is claimed is:

1. A neutralization device for a vehicle having a pair of front wheels and a pair of rear wheels, in which each of the wheels includes a tire wheel attached to a vehicle body and a tire made of non-conductive material that is mounted on the tire wheel,
wherein the tire wheel comprises a non-conductive predetermined member,
the non-conductive predetermined member further includes a predetermined point that is situated a predetermined distance away from a rotational center of the tire wheel and that is exposed to outside of the vehicle,
the tire includes an inner circumferential portion fitted onto the tire wheel;
the neutralization device is adapted to cause corona discharge when a positive potential of the predetermined point to which the neutralization device is attached exceeds a predetermined value, and
the neutralizing device is attached to a surface exposed outwardly widthwise of the vehicle in at least one of the inner circumferential portion of the tire and a predetermined portion of the predetermined member,
wherein the predetermined point is rotated around a rotational center axis of the tire wheel by rotation of the tire wheel.

2. The neutralization device for the vehicle as claimed in claim 1, wherein the neutralization device includes a conductive tape having an edge at which the corona discharge is caused.

3. The neutralization device for the vehicle as claimed in claim 2, wherein a total perimeter of the neutralization device per wheel is set within a range from 170 mm to 185 mm.

4. The neutralization device for the vehicle as claimed in claim 1, wherein the neutralization device includes a coating containing conductive material on which projections are formed to cause the corona discharge.

5. The neutralization device for the vehicle as claimed in claim 4, wherein a total area of the coating per wheel is set within a range from 39.0 mm$^2$ to 42.5 mm$^2$.

6. The neutralization device for the vehicle as claimed in claim 1, wherein the neutralization device contains conductive metal.

7. The neutralization device for the vehicle as claimed in claim 1, wherein the neutralization device contains conductive polymer molecule.

8. The neutralization device for the vehicle as claimed in claim 1, wherein the non-conductive predetermined member further includes a non-conductive coating material.

9. The neutralization device for the vehicle as claimed in claim 8,
wherein the tire wheel further comprises a center portion attached to the vehicle body, a rim portion on which the tire is mounted, and a plurality of spoke portions extending radially between the center portion and the rim portion; and
wherein the non-conductive predetermined member is applied to at least one of the spoke portion and the rim portion.

10. The neutralization device for the vehicle as claimed in claim 1, wherein the non-conductive predetermined member includes a wheel cap made of non-conductive resin material that is attached to the tire wheel.

11. The neutralization device for the vehicle as claimed in claim 1, wherein the neutralization device is attached to at least one of the pair of front wheels and the pair of rear wheels.

* * * * *